United States Patent

Karr et al.

[15] 3,700,313
[45] Oct. 24, 1972

[54] COAXIALLY ADJUSTED OPTICAL MOUNT

[72] Inventors: Lawrence J. Karr, Venice; Norman Fried, Los Angeles, both of Calif.

[73] Assignee: TRW Inc., Redondo Beach, Calif.

[22] Filed: Dec. 27, 1971

[21] Appl. No.: 212,525

[52] U.S. Cl. ............................... 350/288, 331/94.5
[51] Int. Cl. ............................................. G02b 5/08
[58] Field of Search ..... 74/89.15; 248/180; 331/94.5; 350/271, 288, 304, 310

[56] References Cited

UNITED STATES PATENTS

| | | | |
|---|---|---|---|
| 3,402,613 | 9/1968 | Neusel et al. | 350/288 |
| 3,601,476 | 8/1971 | Mackenzie | 350/288 |
| 3,478,608 | 11/1969 | Met | 350/310 |
| 3,428,915 | 2/1969 | Leone et al. | 350/304 |

Primary Examiner—David Schonberg
Assistant Examiner—Michael J. Tokay
Attorney—Daniel T. Anderson et al.

[57] ABSTRACT

First and second plates facing one another are hinged at one edge by a strip of spring metal. An adjusting screw coupled between the plates urges the plates together or apart to position an optical element, lying in the first plate, along a first axis. A third plate is hinged to the second plate along a second edge 90° to the first edge. A second adjusting screw coaxial with the first one couples the second and third plates together for positioning the optical element along a second axis 90° to the first axis.

6 Claims, 3 Drawing Figures

Patented Oct. 24, 1972
3,700,313
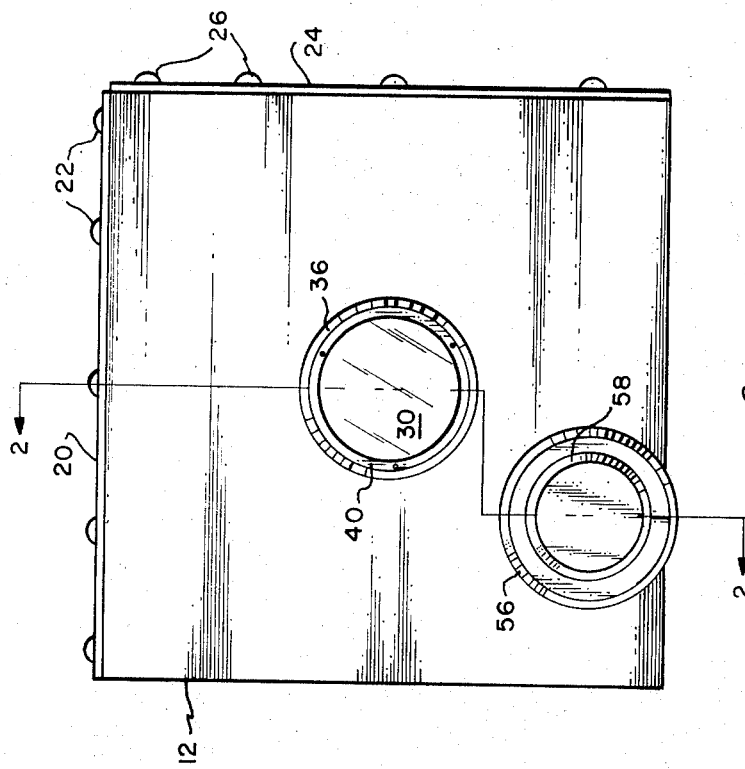
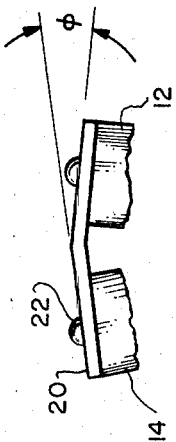
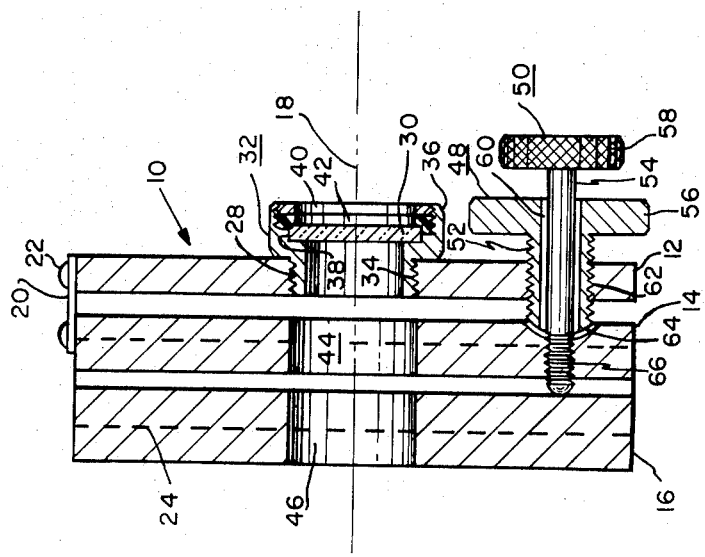

COAXIALLY ADJUSTED OPTICAL MOUNT

BACKGROUND OF THE INVENTION

1. Field of the Invention

This invention relates to adjustable mounting means for optical elements and particularly to mounting means capable of adjusting the element in two axes relative to a third optical axis.

2. Description of the Prior Art

Optical elements and components used in laser systems desirably must be mounted by means that are easily adjustable, mechanically stable, free of backlash in the adjusting mechanism, insensitive to moderate thermal change, and capable of fine incremental changes in selected axes without affecting the adjustment in other or adjacent axes. The optical mounting means of the present invention accomplishes all of the above requirements in a simple configuration.

SUMMARY OF THE INVENTION

Three rectangular flat plates are mounted close together, with the first and second plates hinged along a first edge by a flat spring member, and the second and third plates hinged along a second edge normal to the first edge by another flat spring member. The spring members or hinges are biased or bent to urge the plates towards each other. The first plate has an opening for mounting an optical element therein, and corresponding openings are provided in the second the third plates aligned therewith to provide an unobstructed light path to and from the optical element along an optical axis normal to the plates.

A pair of coaxial adjusting screws are mounted in the plates parallel to the optical axis. One of the screws threads into the first plate and its tip abuts the second plate so that upon turning the screw the first plate can be moved away from or toward the second plate to adjust the axial position of the optical element along one axis normal to the optical axis. The other screw threads into the second plate and its tip abuts the third plate so that upon turning the screw, the first and second plates together can be moved away from or towards the third plate to adjust the axial position of the optical element along the other axis normal to the optical axis.

The spring hinges are biased by their being slightly bent inwardly so that when the adjusting screw tips are urged against the respective plates, an axial force is applied to the screw threads to prevent any backlash during further adjustment.

The spring hinges are formed of an alloy that has a linear coefficient of thermal expansion that closely matches that of the plate material so as to minimize any instability due to thermal change.

BRIEF DESCRIPTION OF THE DRAWING

FIG. 1 is a top plan view of an optical mount according to the invention;

FIG. 2 is a section taken along line 2—2 of FIG. 1; and

FIG. 3 is an enlarged side elevational view of a spring hinge.

DESCRIPTION OF THE PREFERRED EMBODIMENT

Referring now to the drawing there is shown by way of example, a mirror mount assembly 10 that is employed in a solid state laser for mounting one of the end mirrors of the optical cavity thereof. The mirror mount assembly 10 includes three rectangular metal plates 12, 14, and 16, mounted close together facing each other and with their faces normal to a given optical axis 18. The first plate 12 and second plate 14 are joined together or hinged along one edge by a stiff metal strip hinge 20 that is fastened to the plates 12 and 14 by means of screws 22. Similarly, the second plate 14 and third plate 16 are hinged along a different edge by another similar metal strip hinge 24 by means of screws 26 so that the hinges 20 and 24 are perpendicular to each other.

The first plate 12 is provided with a circular opening 28 for housing an optical element, such as an end optical mirror 30 of a laser. The mirror 30 is supported in an annular mirror mount 32 having a lower threaded portion 34 that screws into the circular opening 28 and a knurled end portion 36 of larger diameter than the circular opening 28. The lower surface of the end portion 36 abuts the front face of the first metal plate 12 when the mirror mount 32 is fully advanced.

The end portion 36 of the mirror mount 32 is provided with an inner flange 38 for supporting the mirror 30. The mirror 30 is held firmly in the flange 38 by a retaining ring 40 threaded into the front opening of the end portion 36 over a soft gasket 42 of rubber or other suitable cushioning material.

The second and third plates 14 and 16 are similarly provided with circular openings 44 and 46 respectively aligned with the circular opening 28 in the first plate 12. The two circular openings 44 and 46 provide an unobstructed light path through the two plates 14 and 16 to the mirror 30, and may in some optical systems accommodate the mounting of additional optical components, such as a light polarizer, a Pockels cell, a lens or other optical mirror. It may be necessary in such optical systems to align three such optical components along the same optical axis 18.

In order to optically align the mirror 30 along the optical axis 18, it is necessary to adjust the mirror 30 so that the other two axes lying in the plane thereof are precisely at right angles to its optical axis 18. In order to provide this adjustment, a pair of coaxial adjusting screws 48 and 50 are mounted in the first and second plates 12 and 14 respectively. The shank 52 of the first adjusting screw 48 is wider in diameter and shorter in length than the shank 54 of the second adjusting screw 50. The knob 56 of the first adjusting screw 48 is larger in diameter than the knob 58 of the second adjusting screw 50. The shorter, first adjusting screw 48 has a central longitudinal bore 60 of larger diameter than the shank 54 of the longer, second adjusting screw 50 so that the longer screw 50 extends coaxially through the shorter screw 48.

The shorter screw 48 is threaded along most or all of its shank length and mates with a threaded hole 62 in the first plate 12. The shank 52 of the shorter screw 48 is long enough to extend through the first plate 12 so that the tip thereof abuts the second plate 14 when the two plates 12 and 14 are substantially parallel, and yet additional length of the shank 52 is left between the plate 12 and the knob 56 to allow further advance of the screw 48. The tip of the screw shank 52 is rounded to fit within a slight rounded depression 64 in the abutting surface of the second plate 14.

The longer screw 50 is threaded on the lower portion of its shank length and mates with a threaded hole 66 in the second plate 14. The shank 54 of the longer screw 50 is long enough to extend through the second plate 14 so that the rounded tip thereof abuts the flat surface of the third plate 16 when the second and third plates 14 and 16 are substantially parallel, and yet sufficient clearance is provided between the two knobs 56 and 58 to permit further advance of the longer screw 50 as well as retraction of the shorter screw 48.

Each of the metal strip hinges 20 and 24 are formed with a slight bend along their length. They are attached to the plates 12, 14 and 14, 16 respectively, with the bend facing inwardly toward the plate edges, as shown in FIG. 3, wherein plates 12 and 14 are connected by bent hinge 20. Thus, when the adjusting screw 48 is in retracted position, the hinged plates 12 and 14 converse slightly. Then when the adjusting screw 48 is advanced, the hinged plates 12 and 14 spread apart, causing the hinge 20 to bend backwards and tending to straighten the hinge 20. In so bending the hinge 20, a stress is placed on the hinge 20 and because of its resiliency or springiness, the hinge 20 tends to resist the bending force placed on it and exerts a spring force or bias of its own on the two plates 12 and 14 urging them together. The spring bias is transmitted to the threaded hole 62 mating with the threads of the adjusting screw 48 forcing the threads together and taking up any backlash in the threads. Thereafter the adjusting screw 48 can be moved in either direction without encountering any backlash.

Referring now particularly to FIG. 2, it can be seen that the first plate 12 and the second plate 14 are connected by the metal strip hinge 20 extending in a direction normal to the plane of the paper, that the shorter adjusting screw 48 is coupled between these plates 12 and 14, and that the first plate 12 contains the mirror 30 in the mirror mount 32. When the shorter adjusting screw 48 is advanced, it urges the first plate 12 and second plate 14 apart, and when the adjusting screw 48 it retracted, it urges the plates 12 and 14 together. Considering the second plate 14 to be fixed, it can be seen that the first plate 12 moves away from the second plate 14 when the adjusting screw 48 is advanced, and moves towards the second plate 14 when the adjusting screw 48 is retracted. Thus by rotating the knob 56 of the shorter adjusting screw 48, the position of the mirror 30 can be adjusted along the vertical axis as viewed in FIG. 2, the optical axis 18 being viewed as extending horizontally.

Similarly, it can be seen that the other metal strip hinge 24, extending vertically in the plane of the paper, connects the second plate 14 and third plate 16. It is further seen that the longer adjusting screw 50 is coupled between the second and third plates 14 and 16. Considering the third plate 16 to be fixed, when the longer adjusting screw 50 is advanced, it urges the second plate 14 away from the third plate 16. Since the first plate 12 is connected to the second plate 14 by the strip hinge 20, it too moves together with the second plate 14, causing the mirror 30 to rotate to the right about the vertical axis. When the longer adjusting screw 50 is retracted, it urges the first and second plates 12 and 14 towards the third plate 16, causing the mirror 30 to rotate to the left. It can thus be seen that by rotating the knob 58 of the longer adjusting screw 50, the position of the mirror 30 can be adjusted along the axis directed normal to the plane of the paper.

As described previously, the strip hinges 20 and 24 are pre-bent to provide a spring bias on the plates and take up any backlash in the adjusting screws 48 and 50. As seen in FIG. 3, the angle $\phi$ indicating the degree of bend need only be very slight and depending upon the particular metal chosen and the thickness, may be as small as ½° and as large as 10°. With plates 12, 14, 16 made of aluminum for light weight and easy machineability, it is preferred to fabricate the strip hinges from an alloy consisting essentially of 3 percent by weight beryllium and the remainder copper. Using such a beryllium copper alloy, satisfactory strip hinges have been formed from 0.030 inch stock bent to an angle $\phi$ of 2.2°. Such an alloy provides hinges having the necessary spring properties, and in addition has a linear temperature coefficient of expansion closely matching that of aluminum. By matching the thermal expansion characteristics of the plates 12, 14, 16 and the strip hinges 20, 24, any relative movement of the parts caused by thermal changes is minimized.

The adjusting screws 48 and 50 are preferably made of the same material as the plates 12, 14, 16, namely aluminum, to also minimize thermal drift. To permit the adjusting screws 48 and 50 to turn freely in the threaded holes 62 and 66, a silicone grease is advantageously used to lubricate the threads, and also the bearing surfaces between the tips of the adjusting screws 48 and 50 and the plates 14 and 16. One such product is number G-322-L light grade silicone lubricating grease sold by General Electric Company under the trademark Versilube.

The knobs 56 and 58 of the adjusting screws 48 and 50 are of different size to enable differentiation by touch and easy identification when it is necessary to adjust in the dark. The knobs 56 and 58 are also preferably color coded to enable easy identification by sight.

What is claimed is:

1. An optical mounting assembly, comprising:
  a. first and second rectangular plates mounted face to face;
  b. a first spring hinge fastening said plates along one edge thereof;
  c. means forming an opening in each of said plates aligned each with the other for mounting at least one optical element therein having an optical axis extending through said openings;
  d. a first adjusting screw coupled to said plates at a region removed from said spring hinge to urge said plates together or apart and thereby position said optical element along an axis perpendicular to said optical axis;
  e. a third plate similar to said first and second plates mounted face to face with said second plate and provided with an opening aligned with the first two openings;

f. a second spring hinge fastening said second and third plates along a second edge perpendicular to said one edge; and g. a second adjusting screw mounted coaxially with said first adjusting screw and coupled to said second and third plates for urging said second and third plates together or apart, said first plate moving with said second plate to thereby position said optical element along a second axis perpendicular to both said first and said optical axes.

2. The invention according to claim 1, wherein said adjusting screws extend normal to said plates and parallel to said optical axis.

3. The invention according to claim 1, wherein said spring hinges are formed of substantially flat metal stock bent slightly along their long axis.

4. The invention according to claim 3, wherein said bent hinges are attached to said plates in a sense to exert a bias urging said plates together.

5. The invention according to claim 3, wherein said hinges and said plates are formed of different metal closely matched in linear-thermal coefficient of expansion characteristics.

6. The invention according to claim 5, wherein said plates are formed of aluminum and said strip hinges are formed of an alloy consisting essentially of 3 percent beryllium by weight and the remainder copper.

* * * * *